June 6, 1939.  R. J. L. MOINEAU  2,161,374
MOTOR PUMP OR ELECTRIC GENERATOR
Filed June 24, 1936
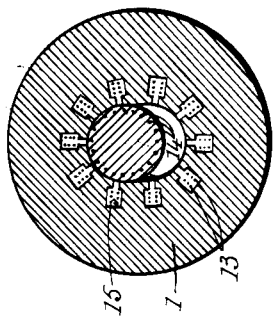
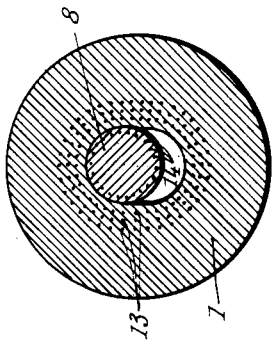
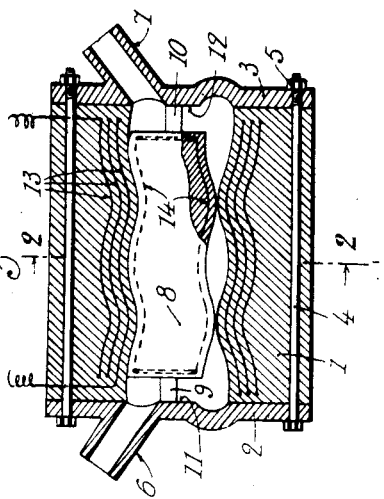
René Joseph Louis Moineau
INVENTOR
By Otto Munk
his ATT'Y.

Patented June 6, 1939

2,161,374

UNITED STATES PATENT OFFICE 2,161,374

MOTOR PUMP OR ELECTRIC GENERATOR

René Joseph Louis Moineau, Paris, France

Application June 24, 1936, Serial No. 86,960
In France May 26, 1936

5 Claims. (Cl. 103—118)

The present invention has for its object a rotary machine which is chiefly characterized by the fact that it comprises a single rotor and a single stator (which might itself be rotary), these being so arranged as to constitute, respectively, the rotor and the stator both of an electric machine (motor or generator) and of a mechanical combination (pump, compressor or motor of the hydraulic or pneumatic type).

The said rotary machine can therefore be used: either as a motor-pump or motor-compressor, the motor being of the electric type; or as an electric motor-generator, the motor being in this case, of the hydraulic or pneumatic type.

The said machine thus comprises but two parts, a stator and a rotor; there is no longer a transmission or a non-leaking joint, as usual, between the electric machine (motor or generator) and the mechanical device (pump, compressor or motor), the two functions conferred upon the said machine and the said device being fulfilled by the same parts, and in particular, by the same stator and the same rotor.

Various systems of pumps or compressors, and various known forms of construction of electric machines may obviously be employed.

The invention has chiefly for its object a rotary electro-mechanical apparatus comprising a helical rotor adapted to rotate in a helical stator with which it is in gear engagement in the known manner, the stator having a helical thread or tooth more than the rotor, each thread or tooth of this latter part being in each transverse section in contact with the surrounding toothed part of the stator, and the pitches, constant or not, of the helices of the two toothed parts having, in each longitudinal section, the ratios of the number of teeth of the said toothed parts, the said stator and rotor further comprising electric windings and also forming the magnetic masses necessary for the electric operating of the machine.

In the accompanying drawing, which is given solely by way of example:

Fig. 1 is a diagrammatic longitudinal section of an electro-mechanical apparatus in conformity with the invention.

Fig. 2 is a cross-section on the line 2—2 of Fig. 1.

Fig. 3 is a partial section of a modification.

Fig. 4 is a front view of a form of construction of one of the two stops of the rotor.

Fig. 5 is a diametrical section of the same.

Figs. 6 and 7 are like views of a modified form of stop.

Fig. 8 is a diagrammatic view of a brush arrangement in the case of an electric machine with commutator.

In the embodiment represented in Figs. 1 and 2, the apparatus comprises a stator 1 having at the ends two respective end-plates 2 and 3 which are secured for instance by bolts 4 and nuts 5 and are provided with tubular connections 6 and 7 leading into the chamber of the said stator. In the said chamber is located a rotor 8 which is held longitudinally by the contact of its ends 9 and 10 with respective machined surfaces 11 and 12 of the end-plates 2 and 3, which form stops.

The stator 1 comprises two helical threads or teeth; the rotor 8 comprises only one helical thread or tooth which in each cross-section is in contact with the toothed part of the stator. The pitch of the stator is double the pitch of the rotor.

The said stator and rotor are provided with respective electric windings 13 and 14, whose arrangement depends upon the nature of the motor which is constructed. In the present example, the motor is of the revolving field type, and the windings 14 of the rotor are of the squirrel-cage type.

In the embodiment herein described, the electric conductors are embedded in the mass of the stator and of the rotor. In the modification represented in Fig. 3, the electric conductors 13 of the stator are contained in grooves or notches 15, in the known manner.

The magnetic masses may consist, according to the usual construction, of sheet-iron discs which are placed together and are insulated (for instance by paper, varnish or rubber and so like), or by a moulded substance containing a considerable proportion of small iron particles. It is also feasible, according to one feature of the invention, to make the said magnetic masses, i. e., the stator and/or the rotor, or a portion of the same, of a yielding material (such as rubber, latex or like products) charged with magnetic filings (of iron, for instance). The use of such a substance which is elastic and magnetic at the same time will permit of associating the advantages of elasticity for the pump, and of a very small air-gap for the electric motor. In the case in which one or more parts of the stator and/or the rotor are not to be magnetic, such part or parts may consist of an elastic substance without magnetic filings.

The operation of the said apparatus is as follows. An electric current for excitation is sent into the winding 13 of the stator 1. The rotor 8 will at once begin to rotate in a given direction, and with a given amount of slip with reference to the revolving field, thus producing a certain driving torque. At the same time, the rotor displaces the fluid to be pumped or compressed, from the conduit 6 (or 7) to the conduit 7 (or 6) according to the direction of rotation, in conformity with the known technics of pumps with helical gearing.

Obviously, the apparatus is reversible, i. e., it is simply necessary to supply a fluid under pressure through one of the conduits 6 or 7, in order to turn the rotor 8 and at the same time to obtain a difference of potential at the terminals of the stator winding.

In all cases, the rotor is operated without making it necessary to act mechanically upon it, and thus it is not necessary to provide any mechanical connection between the said rotor and the exterior of the apparatus. Thus the machine may be quite free from packing, stuffing-boxes, etc., so that its construction is particularly simple and strong, and is not subject to leakage or to any other drawbacks.

The rotor 8 of the aforesaid pump device assumes its proper position by its own action, at all times, in the stator 1 and it is simply necessary to limit its longitudinal displacements by stops. In the construction shown in Figs. 1 and 2, the two small extensions 9 and 10 of the rotor simply make contact with the respective flat surfaces 11 and 12 of the plates 2 and 3 which are adjacent the same, as above set forth.

It is possible, however, to assure a better guiding of the rotor. If it is remembered, in fact that the said stator and rotor form a set of gearing whose pitch circles are $C^1$ and $C^2$ (Fig. 4), the stop surfaces may have the form of small annular surfaces 16—17 (Figs. 4 and 5) which are in contact with the respective circular parts $C^1$ and $C^2$, and this will form a stop in which the pitch circles $C^1$ and $C^2$ roll upon each other without slipping, and the points located on either side of these circles will slip to a very slight degree.

The free rotor 8 may also be guided in a more exact manner.

The degree to which it becomes eccentric when rotating may be limited, for instance by mounting it upon a crankshaft, or more simple, by representing the pitch circles $C^1$ $C^2$, as shown in Figs. 6 and 7, by a journal 18 of the rotor and by an aperture 19 formed in each end-plate 2—3.

Each aperture 19 has a diameter equal to that of the pitch circle $C^2$, each cylindrical appendage 18 of the rotor has a diameter which is equal to that of the corresponding pitch circle $C^1$; the said appendage 18 will thus roll, without sliding, in the aperture 19. A shoulder 20 which is provided upon each appendage 18 and is in contact with the corresponding end-plate 2 or 3, on the periphery of the aperture 19, forms an axial stop for the rotor. This arrangement permits of counteracting the radial stresses due to the unsymmetrical form of the magnetic field, which would tend to increase the eccentricity.

The electric motor represented in Figs. 1 and 2 is a motor without commutator. The addition of a commutator will not modify the invention; it is simply necessary that the brushes 21 and 22 (Fig. 8) be mounted on this commutator 23 in a sufficiently elastic manner to follow at $21^a$, $21^b$ or $22^a$, $22^b$, the movements of this commutator 23 when the rotor 8 rolls in the stator 1, which movements are small and are equal, on either side of the mean position, to the eccentricity of the rotor with reference to the stator.

Obviously, the invention is not limited to the embodiments herein described and represented, which are given solely by way of example.

Although the words stator and rotor have been herein employed, it will be understood that the stator is not necessarily stationary in space, these two words having merely the purpose of expressing that the two members have a relative rotary movement.

Having now described my invention what I claim as new and desire to secure by Letters Patent is:

1. An electric machine adapted to be used either as a motor or as an electric generator and comprising a stator having end-walls, and a floating rotor, said stator and rotor being provided with suitable electric windings and being so shaped that they constitute, respectively, the stator and rotor of a rotary engine adapted to work either as a pump or compressor or as a fluid pressure motor in which the stator and rotor comprise, respectively, helical gear elements disposed within one another, the outer member having one helical thread more than the inner member and the two members being so arranged and shaped that every thread of the inner member is constantly in contact with the outer member in any transverse section, the pitches of the helices of the two members being, in any transverse section, in the same ratio as the numbers of threads of said members, respectively, and said rotor having flat annular surfaces at both ends thereof, the end-walls of the stator being provided on their inner faces with flat annular surfaces, the mean circumferences of said annular surfaces corresponding to the pitch circles of the gearing members constituted by the stator and rotor whereby said annular surfaces bear against one another, one at least of said members (stator and rotor) being constituted at least in part by a flexible material in which small particles of magnetic material are embedded.

2. An electric machine adapted to be used either as a motor or as an electric generator and comprising a stator having end-walls and a floating rotor, said stator and rotor being provided with suitable electric windings and being so shaped that they constitute, respectively, the stator and rotor of a rotary engine adapted to work either as a pump or compressor or as a fluid pressure motor in which the stator and rotor comprise, respectively, helical gear elements disposed within one another, the outer member having one helical thread more than the inner member and the two members being so arranged and shaped that every thread of the inner member is constantly in contact with the outer member in any transverse section, the pitches of the helices of the two members being, in any transverse section, in the same ratio as the numbers of threads of said members, respectively, said rotor being provided with cylindrical extensions on both ends, the diameter of said extensions being equal to that of the pitch circle of the gearing member constituted by the rotor, said end-walls being provided with circular apertures through which said extensions pass, the diameter of said apertures being equal to that of the pitch circle of the gearing member constituted by the stator, said extensions being in contact with the inner surfaces of said apertures and each having a shoulder adapted to bear on the inner flat surface of the wall through which the extension passes, one at least of said members (stator and rotor) being constituted at least in part by a flexible material in which small particles of magnetic material are embedded.

3. An electric machine adapted to be used either as a motor or as an electric generator and comprising a stator and a floating rotor having suitable electric windings, said stator and rotor being so shaped that they constitute respectively the stator and rotor of a rotary engine adapted to work either as a pump or compressor or as a fluid pressure motor in which the stator and rotor comprise, respectively, helical gear elements disposed one within the other, the outer one of said elements having one helical thread more than the inner element and the two elements being so arranged and shaped that every thread of the inner element is constantly in contact with the outer element in any transverse plane, the pitches of the helices of said elements being, in any transverse plane, in the same ratio as the numbers of the threads of said elements, a commutator on the rotor, electric brushes cooperating with said commutator and means for supporting said brushes in such manner that the brushes will be kept in constant contact with the commutator, one at least of said members (stator and rotor) being constituted at least in part by a flexible material.

4. An electric machine adapted to be used either as a motor or as an electric generator and comprising a stator and a floating rotor having suitable electric windings, said stator and rotor being so shaped that they constitute respectively the stator and rotor of a rotary engine adapted to work either as a pump or compressor or as a fluid pressure motor in which the stator and rotor comprise, respectively, helical gear elements disposed one within the other, the outer one of said elements having one helical thread more than the inner element and the two elements being so arranged and shaped that every thread of the inner element is constantly in contact with the outer element in any transverse plane, the pitches of the helices of said elements being, in any transverse plane, in the same ratio as the numbers of the threads of said elements, one at least of the members (stator and rotor) being constituted at least in part, by a flexible molded material in which small particles of a magnetic material are embedded.

5. An electric machine adapted to be used either as a motor or as an electric generator and comprising a stator and a floating rotor having suitable electric windings, said stator and rotor being so shaped that they constitute respectively the stator and rotor of a rotary engine adapted to work either as a pump or compressor or as a fluid pressure motor in which the stator and rotor comprise, respectively, helical gear elements disposed one within the other, the outer one of said elements having one helical thread more than the inner element and the two elements being so arranged and shaped that every thread of the inner element is constantly in contact with the outer element in any transverse plane, the pitches of the helices of said elements being, in any transverse plane, in the same ratio as the numbers of the threads of said elements, one at least of the members (stator and rotor) being constituted at least in part by a flexible material such as rubber in which small particles of a magnetic material are embedded.

RENÉ JOSEPH LOUIS MOINEAU.